United States Patent [19]
Atkinson et al.

[11] Patent Number: 5,358,004
[45] Date of Patent: Oct. 25, 1994

[54] PRESSURE FLUID STABILIZED REGULATOR WITH LEAKAGE ORIFICE

[75] Inventors: Louis D. Atkinson, 12535 W. Wilbur Ave., New Berlin, Wis. 53151; David A. Venhaus, Milwaukee, Wis.

[73] Assignee: Louis D. Atkinson, New Berlin, Wis.

[21] Appl. No.: 49,207

[22] Filed: Apr. 19, 1993

[51] Int. Cl.[5] ............................................. G05D 16/02
[52] U.S. Cl. ............................ 137/505.18; 137/599.1
[58] Field of Search ............... 137/505.18, 599, 599.1; 251/117

[56] References Cited

U.S. PATENT DOCUMENTS

| | | | |
|---|---|---|---|
| 2,016,234 | 10/1935 | Hughes | 251/117 X |
| 2,707,966 | 5/1955 | Taplin | 137/505.18 X |
| 3,039,485 | 6/1962 | Brohl | 251/117 X |
| 3,249,145 | 5/1966 | Alberani et al. | 137/505.18 x |
| 3,675,891 | 7/1972 | Reynolds et al. | 251/117 |
| 4,315,520 | 2/1982 | Atkinson et al. | 137/82 |
| 4,662,401 | 5/1987 | Zingg et al. | 137/599 X |

OTHER PUBLICATIONS

*Rochester Carburetors*, p. 23, H.P. Books, 1973, Doug Roe.

*Primary Examiner*—Stephen M. Hepperle
*Attorney, Agent, or Firm*—Andrus, Sceales, Starke & Sawall

[57] ABSTRACT

A fluid pressure regulator includes a diaphragm operated leakport controlling low liquid or fluid flow rates. A precisely formed leakage unit spaced from the leakport establishes continuous flow from the input to the output. The leakage unit includes an opening in the body of the regulator and a separate orifice unit having an integral molded body and internal precision orifice establishing the continuous flow. The molded body fits within the opening and is firmly attached to the body to create a precise control of flow therethrough. The orifice has a diameter in the range of about 0.001 to 0.030 inches, and establishes precise low flows. The separate orifice unit includes an elongated tubular body with an internal orifice molded as single integral members.

8 Claims, 1 Drawing Sheet

PRESSURE FLUID STABILIZED REGULATOR WITH LEAKAGE ORIFICE

BACKGROUND OF THE INVENTION

This invention relates a stabilized fluid pressure regulator and particular to fluid regulator including a leakport orifice having a pressure responsive closure unit and having a leakage orifice unit.

As fully set forth in the U.S. Pat. No. 4,315,520 whereby issued Feb. 16, 1982 to the present inventor, leakport orifice regulators having a pressure responsive closure elements are will known and used in providing a regulated fluid pressure or flow in response to an input signal. Closure elements generally may include a diaphragm, a bimetal sensor and the like. The system encounters a relatively unstable condition as the gap in the leakport orifice moves to a close spaced relation, establishes a minimal gap for the air flow, resulting in vibration of the closure member. The subject patent discloses a particularly satisfactory solution which minimizes the above adverse characteristics. As fully disclosed therein, forming of the orifice unit with minute notches in a sharp ended planar orifice creates a continuous leakage path and a minimal flow is maintained under all conditions. Further, as the flow gap is reduced, the leakage flow forms a progressively increasing proportion of the total flow. The system results in essentially eliminating the vibration characteristic previously encountered and a stable output pressure, which is free of audible noise or the like.

Although the specially formed orifice has found substantial commercial acceptance, a demand continues for an even more stable structure. Thus, as the orifice is closed, the diaphragm is squeezed onto the orifice and there is a change in the leakage flow. This results in some change in the characteristics.

SUMMARY OF THE INVENTION

The present invention is particularly directed to pressure regulator having a controlled leakage path to meet the additional commercial demand. Generally in accordance with the present invention, a precisely formed leakage port is constructed within the leakport unit wall in spaced relation to the leakport passage and orifice. The leakage or by-path port is a precision formed orifice opening which establishes a continuous flow about the leakport orifice which is constant for all positions of the main leakport unit of the pressure regulator.

In a preferred and optimum embodiment, the leakport orifice is constructed within a lateral wall in substantially coplanar relationship to the orifice, and with the wall forming a common wall between the inlet side and the outlet side of the orifice chambers. A small opening is formed in the wall. A separate orifice element which is separately molded with a precise leakage orifice opening formed within an integral body is inserted into the small opening and secured therein as an integrated leak proof construction to establish and maintain a continuous leakage flow across the leakport orifice.

In a particularly practical construction, the leakage opening includes a simple molded opening in a molded leakport body having the lateral wall extended from the orifice. The leakage opening includes a recess in the exposed surface of the wall with a conical opening projection therefrom into communication with the port to the opposite side of the leakport orifice. The precision formed leakage orifice member is an element having a tubular body with a flange which fits within the recess. The tubular body has a precisely formed axial opening which is substantially free of any surface flaws which might create turbulence in the leakage flow and further has an orifice integrally molded with the tubular body as a one piece element.

The separate spaced leakage orifice unit establishes a regulator having all the advantages of the notched leakport orifice and an improved overall response as the flow is constant for all valve positions.

The present invention provides an improved leakport orifice regulator.

BRIEF DESCRIPTION OF THE DRAWING

The drawing furnished herewith illustrates the best mode presently contemplated for carrying out the invention and is described hereinafter.

In the drawing.

DESCRIPTION OF THE ILLUSTRATED EMBODIMENT

Figure 1:
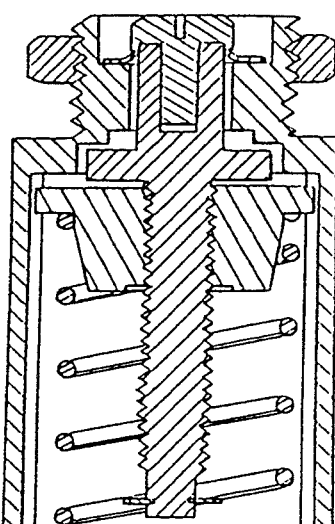
FIG. 1 is a sectional view of regulator incorporating an embodiment of the present invention.
Figure 3:
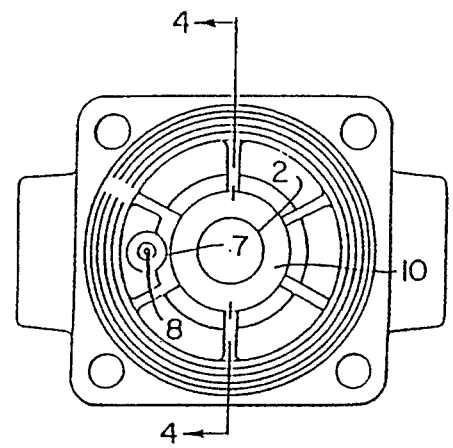
FIG. 3 is a plan enlarged view of the valve body.

Referring to the drawings and particularly to FIG. 1, a pressure regulator is shown including a valve body 1 with a diaphragm actuated valve closure unit 1a positioned in 9 leakport unit 2. The valve unit is adapted to form part of pressure regulator, such as disclosed in the Atkinson patent previously described. The valve body 1 has the central leakport unit 2 which in use is assembled with valve closure unit 1a. A by-pass or leakage port unit 3 is formed within the valve body I in spaced relation to the leakport unit 2 and establishes an unrestricted and continuous passage between the supply port 4 and the port 5 in the valve body 1. The leakage port unit 3 establishes a continuous auxiliary controlled air flow which essentially eliminates hysteresis and an improved regulation characteristic by causing a very slight overpressure in the output side of the regulator. In known construction, the excess pressure is then vented to atmosphere by a secondary valve unit. A secondary valve unit can seal off the vent, whereby the auxiliary air flow in the leakage unit 3 is directed fully to rebalancing the leakport closure. For small unbalance conditions wherein the leakage flow required to correct the unbalance condition, is less than the leakage orifice's capacity, the primary leakport closure assembly need not change, thereby reducing the hysteresis of the entire system. In addition, the system minimizes the bleed of supply to atmosphere while maintaining hysteresis free functioning. The system also eliminates the bleed to atmosphere when forward flow is required from the regulator.

Thus, the structure shown is generally known in the art, except for the leakage port unit 3.

Figure 4:
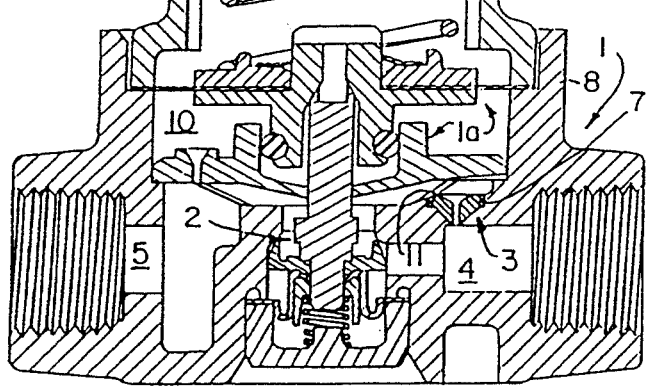
FIG. 4 is a sectional view taken on line 4—4 of FIG. 3.
Figure 4:
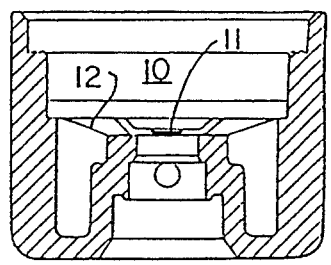
Figure 2:
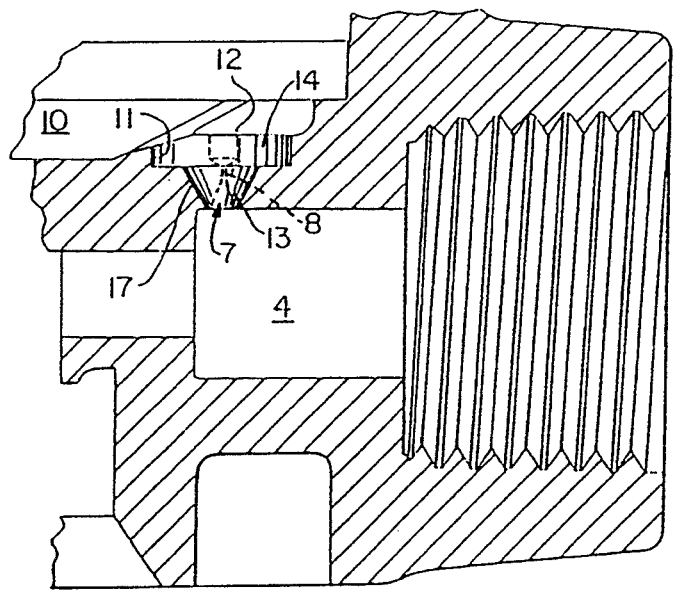
FIG. 2 is a separate sectional view of the valve body including the orifice unit.

In accordance with the illustrated embodiment of this invention, the leakage valve body 1 is formed with leakage opening spaced to one side of the leakport orifice. As shown most clearly in FIGS. 2 and 4a, the leakage unit 3 includes a precision molded plastic orifice unit 7 bonded within the opening 6 and defining a precision orifice passageway including a precise orifice 8 between the supply port 4 and the output side and chamber 10 of the leakport unit 2.

The opening 6 has a cone-shaped opening which extends outwardly from the supply or inlet port 4. The outer end of opening 6 includes a recess 11 in the upper wall 12 which extends laterally from the port 2. The upper wall 12 is shown raised slightly above the port for structural support in the area of the unit 3.

The molded plastic orifice unit 7 includes a tubular body 13 which is a cone corresponding to and located in the opening 6, with an integral top flange 14 located within the recess 11 in the wall 12. A precise round orifice 15 is thus provided within the opening 6 in the body 13.

A suitable adhesive 17 secures the flanged orifice unit in the recess 11 with a fluid sealed connection. The leakage passageway is thereby restricted to the precision formed orifice. The orifices are generally formed with orifice diameters in the range of 0.0015 to 0.025 inches and may be applied to orifices in a range of 0.001 to 0.30 inches.

Figure 5:
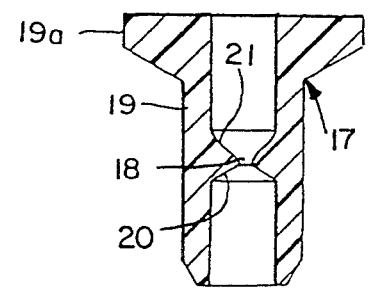
FIG. 5 is a sectional view of a molded orifice unit specially illustrating a preferred construction for the present invention.

A further embodiment of the invention is shown in FIG. 5. In this embodiment, an orifice unit is molded with an orifice 18 is integrally formed within a tubular body 19, which adapts the unit for connection in circuit using conventional tubing or other suitable fluid connectors. The outer wall is shown with an integral flange 19a for mounting of the orifice unit to a support. Again, the unit provides an integral orifice and support body for direct use of the orifice unit in a device or circuit with integral connecting ends.

A particularly satisfactory and unique precision molded orifice unit is disclosed in the co-pending application of Louis A. Atkinson et al filed on Jan. 20, 1993 and assigned Ser. No. 08/007,087.

As more fully disclosed therein, the orifice is formed with the precision orifice 18 having a constant diameter orifice and having an outlet passage with a tapered portion 20 extending from wall 21 and the constant diameter orifice 18 a sharp, flash free stepped edge at the connection of the outlet passage and the inlet passage.

As more fully disclosed therein, special molds are used in a molding procedure which is a standard known procedure used by skilled molding shops. The orifice unit 7 is molded of a high quality polymeric plastic used for forming precision molded plastic ports. The plastic selected is a high strength, rigid plastic which maintains its shape and strength over the expected life of regulator and other devices and uses requiring small precision orifices and passageways. A stable engineering plastic is thus preferred, and both a polycarbonate and polysulfone have provided particularly satisfactory orifice units. Both have good molding characteristics and particularly exhibit a minimum flash characteristic. Polysulfone is a higher temperature plastic but is somewhat more costly. Any suitable adhesive may be used, but the known bromocloramethane provides a particularly good, fluid tight seal of the above materials.

Various modes of carrying out the invention are contemplated as being within the scope of the following claims particularly pointing out and distinctly claiming the subject matter which is regarded as the invention.

I claim:

1. A pressure regulator comprising a valve body having an inlet port and an outlet port with a wall therebetween, a valved opening in said wall, said valve body adapted to have an associated closure member for selectively closing said valved opening and regulate the output pressure, and a precision totally unobstructed leakport orifice unit connecting said inlet port to said outlet port, said orifice unit including a spaced opening formed in said wall in spaced relation to said valved opening, a separate precision formed orifice member located in said spaced opening and including a body member formed of hard plastic and substantially corresponding to said spaced opening in said wall and having a central opening including a reduced round precision orifice integrally formed within said body member and operative to stabilize the output pressure and eliminate vibration characteristics of said closure member as the valve closure member moves to the closed position.

2. The pressure regulator of claim 1, wherein said valve body includes said inlet port connected to said valved opening with said outlet including a chamber wall overlying the inlet end of said inlet port, and said orifice opening being located in said chamber wall.

3. The pressure regulator of claim 2, wherein said orifice opening includes a recess in said chamber wall and a cone-shaped opening extending from said recess to said inlet port, said orifice unit body having a flange bonded within said recess.

4. The regulator of claim 1, wherein said orifice member comprises a single molded tubular body formed of a high strength and rigid thermoset plastic having a central opening and an integral orifice located with said central opening, said orifice being round and having a constant diameter substantially smaller than the diameter of the central opening and joined at one end to the central opening by a curved wall and to the central opening at the opposite end by a stepped wall, said orifice being free of surface defects and establishing a constant diameter leakage port, said tubular body being firmly secured within said spaced opening.

5. The orifice unit of claim 4, wherein said orifice has a diameter in the range of substantially 0.001 to 0.030 inches.

6. The orifice unit of claim 5, wherein said orifice has a diameter in the range of 0.015 to 0.024 inches.

7. The orifice unit of claim 4, wherein said orifice unit is formed of a plastic selected from the group of polycarbonate and polysulfone.

8. The regulator of claim 1, wherein said precision orifice is located between an inlet passage and an outlet passage, said orifice including a flash free step change at said outlet passage with a precise constant diameter passageway extending from said step change to said inlet passage, said inlet passage being conically tapered from said inlet port to said constant diameter orifice and said outlet passage having a tapered portion extending from said step change and thereby said constant diameter orifice, said edge between the tapered portion and said inlet orifice being flash free.

* * * * *

UNITED STATES PATENT AND TRADEMARK OFFICE
CERTIFICATE OF CORRECTION

PATENT NO.   : 5,358,004
DATED        : October 25, 1994
INVENTOR(S)  : Louis D. Atkinson et al It is certified that error appears in the above-identified patent and that said Letters Patent is hereby corrected as shown below:

Col. 4, line 55, claim 8, after "orifice" insert ---member---.

Signed and Sealed this

Ninth Day of May, 1995

Attest:

Attesting Officer

BRUCE LEHMAN

Commissioner of Patents and Trademarks